Figure 3:
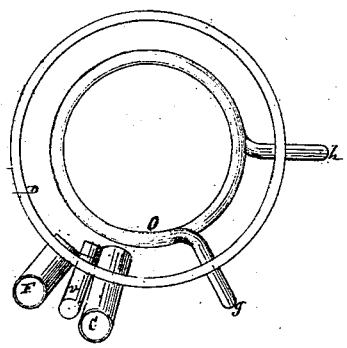
Figure 4:
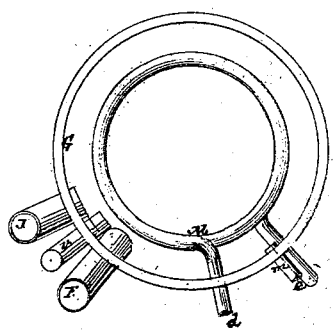

2 Sheets—Sheet 1.
N. HOTZ.
STILL.
No. 82,318. *Fig 1.* Patented Sept. 22, 1868.
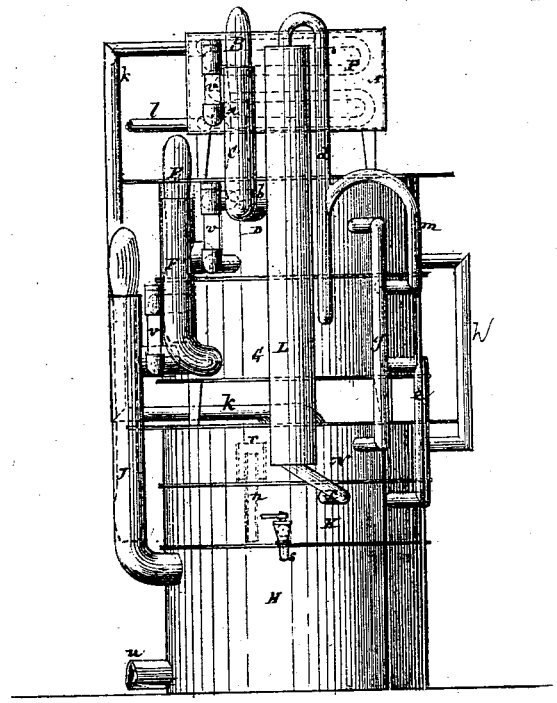
*Fig 2.*
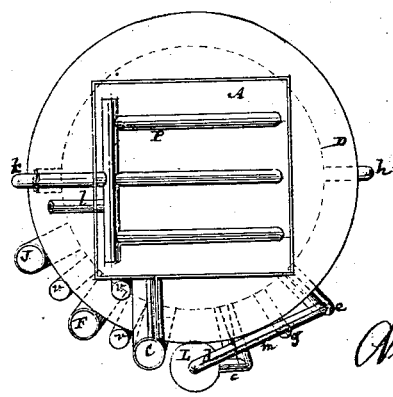
Witnesses. Nicholas Hotz 2 Sheets—Sheet 2.

N. HOTZ.
STILL.

No. 82,318.  Patented Sept. 22, 1868.

Witnesses.
J. W. Coonly
A. Hiller

Nicholas Hotz

United States Patent Office.

NICHOLAS HOTZ, OF GREEN POINT, NEW YORK.

Letters Patent No. 82,318, dated September 22, 1868.

IMPROVEMENT IN STILLS.

*The Schedule referred to in these Letters Patent and making part of the same.*

TO ALL WHOM IT MAY CONCERN:

Be it known that I, NICHOLAS HOTZ, of Green Point, in the county of Kings, and State of New York, have invented a new and useful Improvement in Stills, of which the following is a full, clear, and exact description, reference being had to the accompanying drawing, forming part of this specification, and in which—

Figure 1 represents an elevation of a still constructed in accordance with my invention.

Figure 2, a plan of the same with the top lid or cover removed; and

Figures 3, 4, 5, 6, and 7, plans of certain lower mash-heating and distilling chambers or vessels detached.

Similar letters of reference indicate corresponding parts throughout the several figures.

My invention consists in a novel process of distilling or of effecting redistillation through the action, it may be, of a single heater, by causing the vapor rising from one distillation to be condensed within the mash, and afterwards returned for distillation over again, thus separating the more from the less highly volatile particles, or, in other words, effecting a perfect distillation, and at the same time heating the mash.

Said invention also consists in a combination of upper and lower mash-vessels, arranged to feed or discharge, the one into the other, and of distilling or separating-chambers or vessels, located intermediately of the same, and connected by pipes with worms or other suitable condensing-devices in the upper mash-vessels, and varying the circulation of the vapor upwards and downwards for extraction of the more alcoholic portion of it.

Also, said invention embraces an overflow-pipe or pipes connecting the separators, and column connecting the lower mash-boiler with the worm in an upper mash-vessel, by which combination or arrangement of parts a full or most perfect distillation is secured, and a large economy induced by a greater or more perfect utilization of the heat applied to the still or lower mash-vessel, boiler, or generator.

In describing the apparatus represented in the accompanying drawing, the same will be best done by explaining its operation, as follows: The mash is first put into an upper chamber or vessel, A, from which, on lifting out or removing a plug-stopper, B, or opening other suitable valve, it is run off by a pipe, C, and branches *a b*, into a chamber or vessel, D, the branches *a* carrying it from or near the bottom of the vessel A, and the other branch or bend, *b*, conducting it from the pipe C into the vessel D. The valve or plug B is then inserted or made to close communication through the pipe C, and a plug, E, opened for the purpose of running off, through a pipe, F, having suitable branches or connections, the mash from the vessel D into a chamber or vessel, G, after which the plug E is also closed, and a further similar transfer of the mash from the vessel G made to a yet lower vessel or boiler, H, by opening or removing a plug-stopper, I, to a pipe, J, the stopper to which is afterwards replaced.

Any number of vessels corresponding to D and G, thus receiving the mash, one from the other, may be interposed between the upper and lower vessels A H, and the several vessels either be of a circular or rectangular form, as desired; also, the worms located therein, as hereinafter referred to, be made to run in any desired course or courses.

A proper relative proportion, as regards capacity, should be observed between the several chambers or vessels previously described, so that in running the mash off from one to the other, the contents of the one vessel will form a full or proper charge for the next, and so on in succession.

After the lower vessel or boiler, H, has been charged, as specified, the other vessels, D and G, are also charged successively again through or from each other in the manner described, and from, as a first feeder, the upper vessel, A, which is likewise kept filled or charged, and this operation of supplying the mash kept up or renewed, as required.

The several vessels being thus charged, the necessary heat, by means of steam or otherwise, is applied to the lower vessel, H, from which the boiling mash is, by the act of ebullition, carried, in part, by a pipe, *c*, opening in or through the bottom of a vessel, K, which is seated on or forms a cover to the vessel H, up or to a column, L, from whence the alcoholic vapors are led by a pipe, *d*, down to and through a worm, M, situated within the mash-vessel G, and, after traversing through said worm, pass, by a pipe, $e$, into the separator or vessel K, where they are exposed to the heat of the mash-vessel or boiler H, and the higher wines and alcoholic vapor passed off by a pipe, $f$, opening in or through the bottom of a vessel, N, which is seated on and made to form a cover to the vessel K, up through a pipe, $g$, into and through a worm, O, arranged within the mash-vessel D, and from whence they are passed by a pipe, $h$, down to the vessel N, where redistillation takes place, and the more volatile matter escapes by a pipe, $k$, up into and through a worm, P, arranged within the vessel A, after circulating in or through which it may be drawn or run off by a pipe, $l$.

Connecting with the pipe $d$, leading from the column L, is a pipe, $m$, that forms a vent for the boiling of the mash in the vessel G, and for escape of vapor generated therein through the worm located in the same, along with the vapor passing from the column L, as described.

Figure 5:
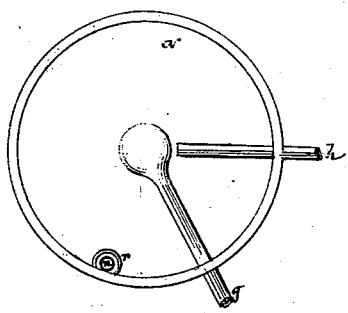
Figure 6:
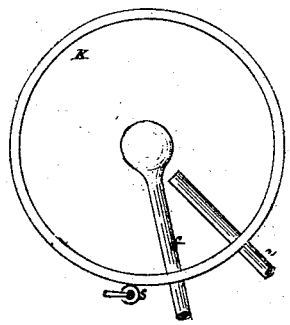
Figure 7:
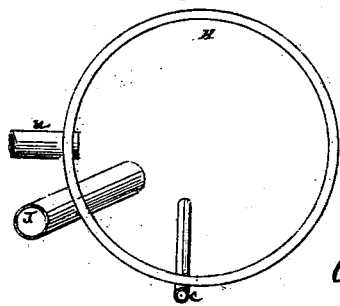

To prevent choking with condensed vapors of the vessel N, and to facilitate or expedite the distilling of the same, an overflow-pipe, of any suitable character, is provided said vessel, and made to connect with the vessel K, at or near its bottom. Such a pipe or combination of pipes is shown in figs. 1 and 5, $n$ being a pipe leading from the body or upper part of the vessel N to near the bottom of the vessel K, and open at both ends, and $r$ a larger tube, open at both ends, surrounding that portion of the pipe $n$ which projects into the vessel N, and extending above it, with a suitable open space established beneath such outer tube, for the lower and denser portion of the liquid, or less volatile part thereof, to pass off by the pipe $n$ into the vessel K, where it is redistilled or evaporated by the increased heat.

The vessel K may be provided with a discharge-pipe, $s$, having a tap or cock for the low-wines, the lower vessel or boiler H with a similar pipe, $u$, for discharge of the residue from the mash, and the several mash-vessels, or any of them, with glass gauges, $v$, for ascertaining the condition or quantities of mash therein.

By this construction of still, made up of separate vessels, as described, a constant and rapid distillation is secured, and this of the most perfect kind, with the largest possible economy, by reason of the disposition of the several connecting mash-vessels, still-chambers, or vessels N K, with the passage of the liquid or vapors up and down repeatedly from vessel to vessel, and exposure of it to irregular temperatures, (as also the mash,) through the worms in which it is made to circulate.

By this, my improved process, redistillation is effected within the same still as a whole, and the mash simultaneously heated by the condensation of the vapors rising from the one distillation prior to their return to the separators for redistillation, and this course of action for extracting the more highly volatile portions of the vapor proceeded with any number of times.

In some cases the plugs or valves provided the pipes C, F, and J, may be dispensed with, and a slow but continuous run of the mash through the apparatus kept up.

What is here claimed, and desired to be secured by Letters Patent, is—

1. The process, substantially as herein described, of effecting continuous redistillation within a still, through, it may be, the action of a single heater or generator, by causing the vapor rising from the one distillation to be condensed within the mash through a worm or worms, or their equivalents arranged therein, and afterwards returned for distillation over again, thus separating the more from the less highly volatile portions, and at the same time heating the mash.

2. The combination of the mash-receiving chamber or vessel A with the mash-vessels D, G, and H, and pipes C, F, and J, provided with suitable plugs or valves for passage of the mash to each of the lower vessels in succession, substantially as specified.

3. The combination, with any desired number of mash-chambers or vessels, A, D, and G, and mash-receiver or generator H, of two or more distilling-chambers or separators, N K, arranged to connect by pipes with worms or other condensing-devices, located in the mash-vessels A, D, and G, for operation, essentially as described.

4. The connection of the distilling-vessels or separators N and K, by means of an overflow-pipe or pipes, $n$ and $r$, substantially as and for the purpose or purposes set forth.

5. The combination, with the mash-boiling vessel or generator H, of the column L, arranged to connect with a worm, or its equivalent, in an upper mash-vessel, essentially as herein set forth.

NICHOLAS HOTZ.

Witnesses:
  J. W. COOMBS,
  A. LE CLERC.